Sept. 11, 1962  M. V. TRACY  3,053,018
CUT-OFF SAW
Filed Feb. 8, 1960  2 Sheets-Sheet 1

INVENTOR.
MEARL V. TRACY
BY
Angus & Mow
ATTORNEYS.

Sept. 11, 1962     M. V. TRACY     3,053,018
CUT-OFF SAW
Filed Feb. 8, 1960     2 Sheets-Sheet 2

INVENTOR.
MEARL V. TRACY
BY
Angus & Mow
ATTORNEYS.

United States Patent Office 3,053,018
Patented Sept. 11, 1962

3,053,018
CUT-OFF SAW
Mearl V. Tracy, La Mirada, Calif., assignor of one-half to Marion G. Tracy, La Mirada, Calif.
Filed Feb. 8, 1960, Ser. No. 7,189
8 Claims. (Cl. 51—98)

This invention relates to a metal cut-off saw.

Metal cut-off saws, particularly those which utilize abrasive cutting wheels, have hitherto been limited as to the hardness and thickness of material which they can cut, and have also been limited as to the speed and the complexity of cuts which they can make. It is an object of this invention to provide a metal cut-off saw which by virtue of the versatility of movement of its blades during cutting operations can cut rapidly through hard and thick materials, and can make cuts of complicated shapes in such materials.

A metal cut-off saw according to this invention comprises a frame for supporting means which mount a blade. These means will preferably, but not necessarily, be attached to the frame by a swivel table so that the angle of the cutting blade relative to a worktable can be adjusted. Whether the suspension means for the blades are attached directly to the frame or to the frame through a swivel table, such means include a rocking member that has an axis of rotation parallel to that of the sawblade so that the sawblade can be rocked in an arc in its own plane, and a nutating member mounted to the rocking member which permits nutation in the same plane along another arc which intersects the first arc. Accordingly, the sawblade may be moved in either nutating movement or rocking movement, or a combination of both (such as straight in and out), while the workpiece is being cut, and this movement enables the saw to make cuts which were hitherto impractical or impossible to make.

According to a preferred but optional feature of the invention, lock means are provided for selectively disabling the nutating member or the rocking member, so that the movement of the sawblade may be restricted to one or the other of these movements.

According to still another preferred but optional feature of the invention, a handle linkage is provided that is connected to the sawblade for enabling the operator to move the blade selectively in the said directions or in any combination of them.

The above and other features of this invention will be fully understood from the following detailed description and the accompanying drawings in which.

Figure 1:
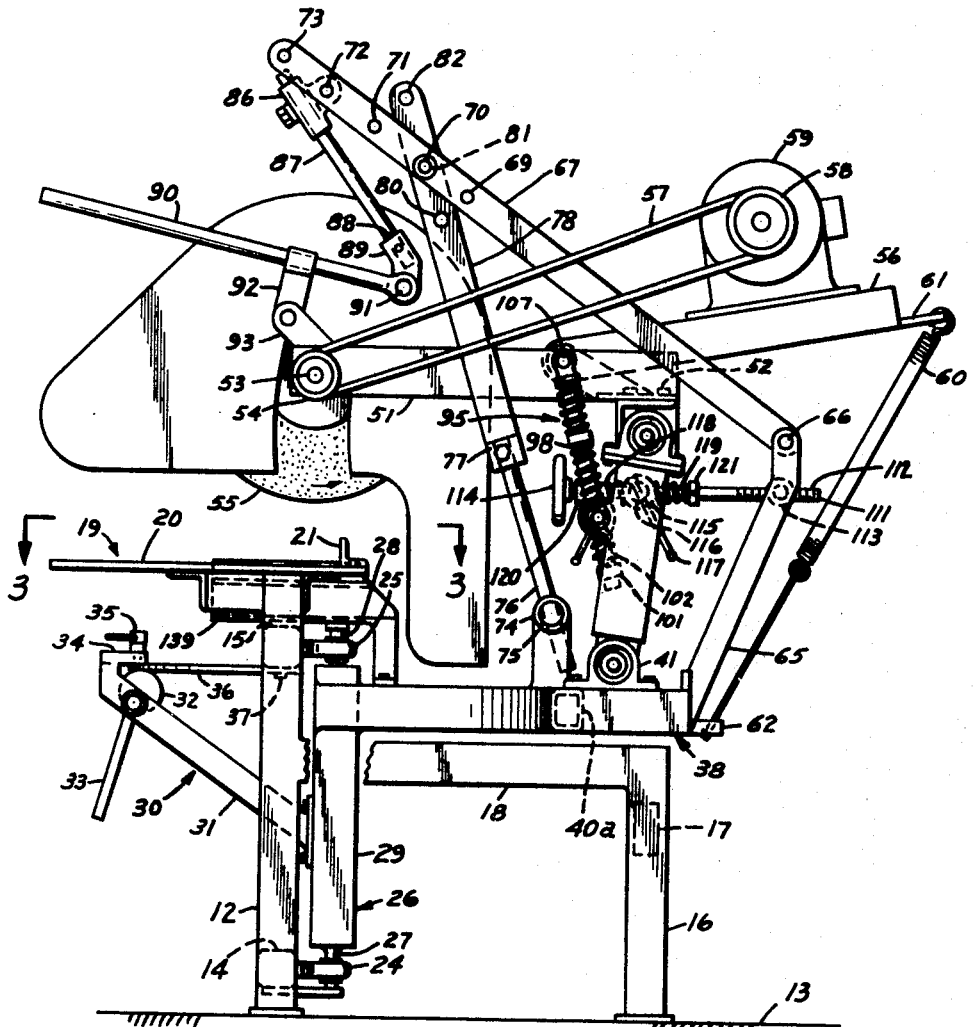
FIG. 1 is a side elevation of a metal cut-off saw according to the invention.
Figure 2:
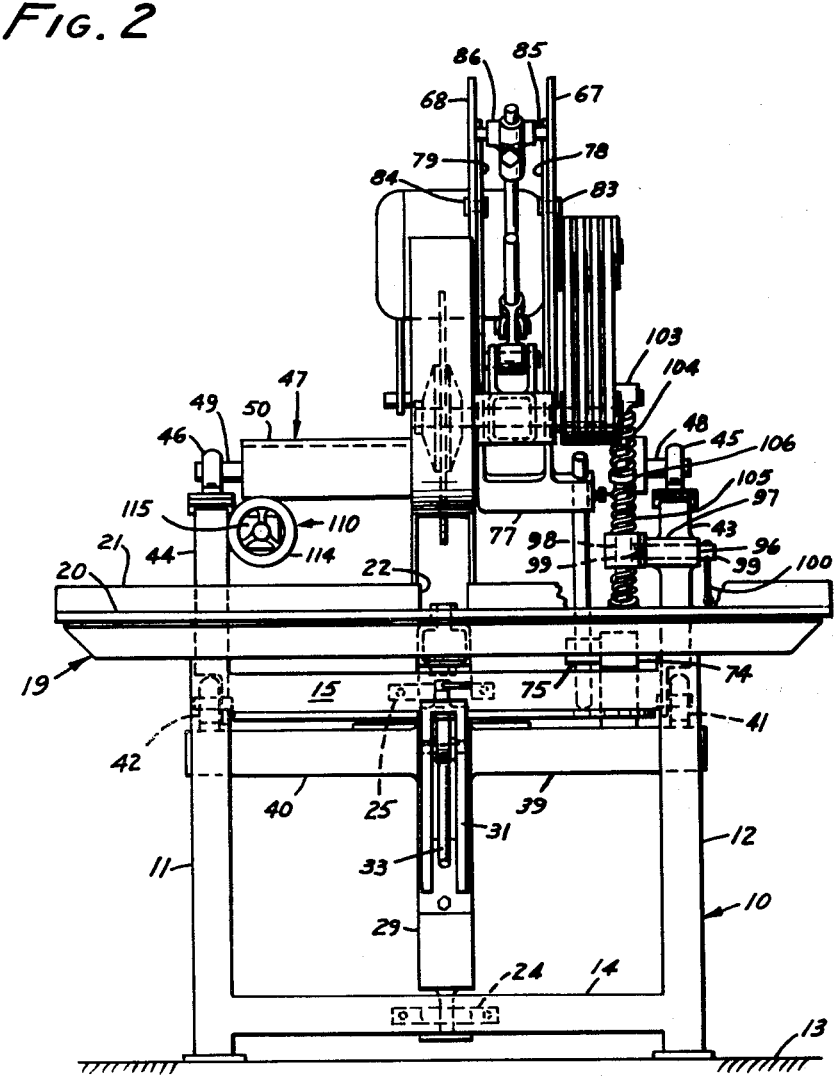
FIG. 2 is a front elevation of the metal cut-off saw taken from the left-hand side of FIG. 1.

With initial reference to FIG. 2, a frame 10 comprises a pair of front legs 11, 12 which stand on the floor 13. A lower beam 14 interconnects the front legs near the bottom thereof, and an upper beam 15 connects the legs near their tops. In FIG. 1, there is shown a rear leg 16 to which is connected a beam 17. Beam 17 also connects to another rear leg, not shown, the frame having four legs in rectangular array.

Figure 3:
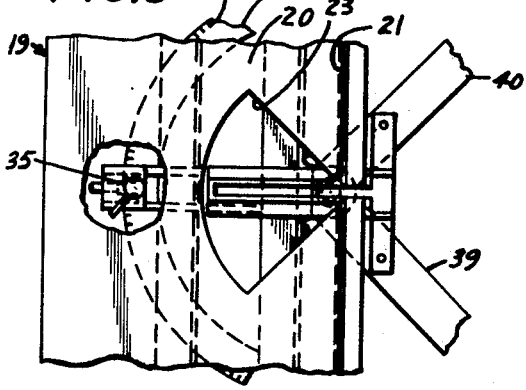
FIG. 3 is a fragmentary cross-section view taken at line 3—3 of FIG. 1.

A beam 18 interconnects rear leg 16 with front leg 12, while a similar beam (not shown) connects leg 11 with the rear leg opposite leg 16. The legs and beams are all welded together to form a strong framework to support the saw mechanism. The front legs rise above the level of the beams to support a worktable 19. The worktable has a flat top surface 20 and a rear flange 21 against which the work may be pressed while it is being cut. A slot 22 is cut in the flange for passing the sawblade. As can be seen in FIG. 3, surface 20 of the worktable has an arcuate cutout portion 23 which permits swiveling of structure yet to be described.

Lower front beam 14 has mounted thereto a bearing 24 (see FIG. 1). A similar bearing 25 is mounted to beam 15. The axes of the bearing are vertically aligned, and support a shaft 26 between them. The shaft has pins 27, 28 at its ends which are journaled in bearings 24, 25, respectively. Between the pins there is welded a box section 29. A swivel adjustment means 30 is attached to the box section.

The swivel adjustment means includes a bifurcated cantilever support 31 that is mounted to the box section. The support mounts a cam 32 connected to a handle 33. Above the cam there is an overhanging shoulder 34 which carries a lock 35. The cam and the lock are spaced apart from each other to receive a quadrant 36 between them. Pressing handle 33 downward presses the quadrant against the lock. The lock is a threaded bolt that passes through the shoulder. The quadrant is pressed against it by the cam. The lock is adjustable to compensate for varying thicknesses of the quadrant, and to adjust the degree of tightness of clamping action exerted by the cam.

The quadrant is mounted by bolts 37 to the under surface of beam 15. Shaft 26 cannot be turned when cam 32 presses the quadrant against the lock, but when the cam is relieved, the cantilever means can move around by swiveling with shaft 26. The quadrant is provided with graduations 36 to indicate the angular setting of the equipment mounted to shaft 26.

A cantilevered swivel table 38 is attached to box section 29. As can be seen in FIGS. 1 and 2, the swivel table includes a pair of spaced-apart arms 39, 40. The free ends of arms 39 and 40 are joined by a beam 40a. These three members form a base support for the saw mechanism. The term "base support" also includes structure rigidly attached to the frame, instead of swivelly, in the event a non-swivel saw is desired. The angular orientation of the swivel table is indicated by the position of the cantilever support 30 relative to the quadrant.

Each of arms 39 and 40 carries a base bearing 41, 42, respectively (FIG. 2). Upright rocking members 43, 44 are pivotally mounted to these bearings. A suitable construction for this is box sections with reduced ends that are mounted to the respective arms.

At the upper end of each of rocking members 43 and 44, there are carried bearings 45, 46. A shaft 47 is journaled in these bearings. This shaft has reduced ends 48, 49, and a central box section 50.

Members 43, 44 mount structure for rocking movement. Shaft 47 acts as a nutating member in that structure mounted by it can nutate.

A sawblade support arm 51 (FIG. 1) is attached by bolts 52 to box section 50. At the end of the sawblade support arm there is carried a shaft 53 which mounts drive wheels 54 and a sawblade 55.

There is also attached to box section 50 a motor support 56 which is pivotally attached so that the motor can be adjustably raised or lowered relative to arm 51 in order to adjust the tension on drive belts 57. The belts interconnect a drive wheel 58 on motor 59 (which is mounted to support 56) with the drive wheels 54 on shaft 53. The motor thereby serves to drive the sawblade. The adjustability of the motor support relative to the saw support arm provides means for adjusting tension on the belts, lowering the motor acting to tighten the belts.

A spring 60 is placed in tension between a lug 61 on the motor support and a lug 62 on swivel table 38. It biases the sawblade upwardly and forwardly. The direction of bias can be selected by attaching the spring at different places. The direction the blade actually moves is at least partially limited by linkage yet to be described.

The above-described structure serves to suspend the sawblade at a location near the worktable, and to provide means for adjusting the angle of cut of the saw relative to the worktable. Means will now be described for moving the saw relative to the worktable so that it will carry out the desired functions.

A pair of stanchions 65 are welded to the rear of arms 39 and 40, and rise upwardly and rearwardly from the base support. At their upper ends, the stanchions are joined by a rod 66 which passes through them. The rod is circular and acts as a pin joint for a pair of arms 67, 68. These arms have holes therethrough to pass the rod. The arms extend forwardly over the base support and pass the motor support with clearance. The arms have holes 69—73 therethrough.

A bearing 74 is mounted to arm 39, and journals a shaft 75. The shaft 75 receives an end of a rod 76 which is fitted transversely through said shaft and held tightly thereby. The other end of rod 76 is fixed to a yoke 77, which yoke is attached to a pair of arms 78, 79 that have holes 80—82 therethrough. Pins 83, 84 serve to join arms 67 and 78, and 68 and 79, respectively, together.

Due to the pivotal movement possible at the joint of arms 67 and 68 with rod 66, and of the rotation of shaft 75, the four arms can be adjusted so that the pins can be passed through selected pairs of holes, thereby providing for adjustment of the angle and elevation of arms 67 and 68. This also provides a closed-link circuit so that the arms 67 and 68 act as a support element to provide a fixed reference point at a selected elevation in space for linkage yet to be described.

To a selected set of holes 69—73, such as holes 72 in arms 67 and 68, there is fixed a shaft 85, the shaft serving to interconnect the arms. This shaft also serves to mount a knuckle 86 which in turn mounts a link 87. The link is received in a socket 88 at an elbow 89. This elbow supports a handle 90, the handle being joined to the elbow by a pin 91. The handle is tightly gripped by a hinge 92 which is mounted to a lug 93 on sawblade support arm 51. Manipulation of the handle can provide for movement of the axle of the sawblade through the above linkage. For example, pressing to the right on the handle in FIG. 1 will cause the sawblade to move to the right at a constant elevation. Lifting the handle will cause the sawblade to move upward, without in and out motion. Also, any combination of these movements is attainable.

Means are also provided for locking out certain of said movements, and for making an initial adjustment of the position of certain elements of this device. As best shown in FIG. 1, a nutating movement lock 95 comprises a journal 96 mounted to rocking member 43. This journal comprises a tube 97 through which a rod 98 is slidably fitted. A screw 99, with a handle 100 on it for tightening down the screw 99, passes through the tube 97 so that it can be brought to bear against the side of the rod 98. Near the lower end of the rod 98 there is a collar 101 which holds a bias spring 102 between itself and a lower face of the journal 97. Above the journal 97 and mounted to the rod 98, there is a collar 103 and a pair of bias springs 104, 105, which are separated by a spacer 106. Two springs are provided above because of the length involved, it being more convenient to use a plurality of short springs than one long spring. Also, one of the springs could be taken out if desired, to adjust the machine in a lower position without the necessity for compressing the springs to a shorter length.

The upper end of rod 98 is hinged to sawblade support arm 51 by pin 107 so that the rod can swing in the plane of FIG. 1.

The sawblade support arm 51, in its nutating movement, moves up and down against the pressures of the respective springs, these springs tending to hold the arm 51 in a pre-selected neutral position, which may be adjusted by fixing the location of the collars 101 and 103 along the rod 98. If it is desired to lock out nutating movement, then screw 99 need only be tightened down, and this disables and locks out the nutating movement.

A rocking movement lock 110 is also provided, this lock including a rod 111 with threads 112 at its rearward end. These threads are engaged in a nut 113. The nut is mounted to one of stanchions 65. A hand wheel 114 at the forward end of rod 111 is provided for making a longitudinal adjustment of the rod by turning it so that the rod moves forwardly or rearwardly through nut 113.

A journal 115 is mounted to rocking member 44, and rod 111 is reciprocable therein. A screw 116 is threaded through the side of the journal and carries a handle 117 by which the screw can be tightened down against the rod. Springs 118, 119 are placed on opposite sides of the journal and are backed up by collars 120, 121, respectively. The tension and location of the springs may be adjusted by selecting the position of the collar along the rod. The bias in the respective directions can be further adjusted by turning the rod in nut 113.

The rocking movement lock provides means for both selecting an initial bias and neutral location for the sawblade, and also means for locking out rocking movement when a purely nutating movement is desired.

Figure 4:
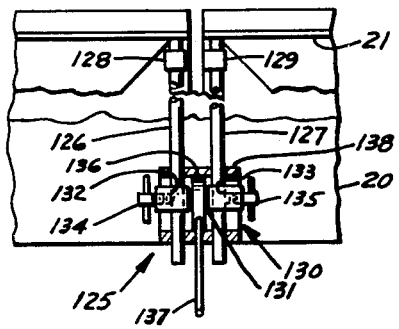
FIG. 4 illustrates a clamping means useful with the metal cut-off saw shown in FIG. 1.

In FIG. 4 there are shown means for holding a workpiece against flange 21 so that the workpiece can be sawed. This holder is optional, but will ordinarily be provided, particularly when an irregular workpiece is to be cut, or when an oblique cut is to be made. A U-shaped mount 125 is fixed to the worktable away from flange 21. It has two pairs of aligned holes in its upright arms which pass a pair of rods 126, 127. These rods bear feet 128, 129 that are to be pressed against the workpiece. Between the arms is a cam member 130 which includes an axle 131 with transverse holes 132, 133 that respectively pass rods 126, 127. Screws 134, 135 enter the ends of axle 131 and can be brought to bear against respective rods 126, 127. The distance the feet are spaced from the axle can thus be adjusted and set.

A cam 136 is rotatably mounted to the axle 131, and carries a handle 137. The cam 136 is adapted to bear against arm 138 of the mount 125 when the handle 137 is pushed down. This forces the feet 128 and 129 against the workpiece and tightens down on the workpiece. Thus the clamp is adjustable to hold materials of varying shape. The spacing apart of the feet 128 and 129 enables the sawblade to cut between them.

A channel member 139 protects the sides of the sawblade beneath the worktable. It is mounted to the swivel table 38.

The operation of this device will now be described. After the workpiece is mounted to the worktable and held firmly thereto, perhaps by the clamping means shown in FIG. 4, handle 90 is grasped and the operator may thereafter, while both locks are unlocked, move the wheel in any direction in the plane of FIG. 1. Up and down movement is permitted principally by the nutating member with a little compensation from the rocking member, while horizontal back and forth movement is largely provided by the rocking member with a little compensation from the nutating member. The blade turns in the direction shown which biases the wheel toward the operator, so that his principal effort is ordinarily spent in pushing the sawblade away from him. Therefore, when the locking members are both unlocked, a straightforward back and forth motion over the surface of the workpiece is caused by a straight push in on the handle, and when the saw has reached its inner limit, then the movement of the saw pulls itself out as it cuts.

Should no cutting action be desired on the backstroke, then the handle may be lifted slightly to pull the blade out of contact with the workpiece while being pressed backward.

Many cuts require only a straight downward movement, and this may be accomplished by locking the rocking movement, and simply letting the sawblade move on the nutating axis by lifting on the end of the handle to move the blade up and letting it fall of its own weight, perhaps keeping the pressure light by maintaining an upward restraint on the handle.

Should no nutating be desired, but simply an in and out motion, then the nutating lock is locked and thereafter the device can only rock on its rocking axis.

A principal limitation on the efficiency of hitherto unknown metal cut-off saws is their inability to move freely in their own plane for certain kinds of difficult cuts. For example, in many cuts it is desired to keep going straight back and forth across the workpiece, and this of course requires either a slide mechanism which is difficult to adjust for up and down motion, or in the class of saw shown, some means for up and down compensation. The slide means requires a complicated construction. As to compensated movement, there has not hitherto been a provision made for up and down compensation, in connection with a rocking movement in conventional saws. This is supplied by the invention, and the operator is now able to move the saw smoothly back and forth in a level plane over the workpiece, or to make any other desired movements, limiting them as he wishes by judicious and appropriate uses of the various locks, thereby allowing the operator to make cuts hitherto considered impossible.

More complex cuts are available by unlocking cam 32 and swinging the base support to the desired angle. The blade will then attack the workpiece at the angle indicated on the quadrant.

This invention is not to be limited by the embodiment shown in the drawing and described in the description which is given by way of example and not of limitation, but only in accordance with the scope of the appended claims.

I claim:

1. A cut-off saw comprising: a base; a worktable mounted on the base adapted to support a workpiece to be cut; a rotary sawblade having its plane of rotation vertically oriented and its axis of rotation horizontally oriented; power means for driving said blade; mounting means comprising a rocking member pivotally mounted to the base, and a nutating member pivotally mounted to the rocking member, both members having an axis of rotation parallel to that of the sawblade, said sawblade and power means being mounted to the nutating member; a support member mounted to the base providing a stationary reference point relative to the axes of rotation of the members; and linkage interconnecting the support element and the nutating member enabling the sawblade to be moved in rocking or nutating movement about either of the axes of rotation of the rocking and nutating members, or in a combination of both, said linkage comprising a hinge mounted to the nutating member, a handle mounted to the hinge and projecting from both sides thereof, a link hinge-mounted to said reference point and to the handle, the latter mounting being spaced from the hinge which mounts the handle to the nutating member, whereby lifting and lowering force on the handle raises the sawblade in nutating movement, and horizontal movement of the handle rocks the sawblade.

2. A cut-off saw according to claim 1 in which said hinge mounts the handle at a location above the nutating member, and spaced from the center of rotation of the hinge, the handle and the link lying in the same plane.

3. A cut-off saw according to claim 1 in which the support element comprises a pair of arms hinge-mounted to the base at spaced-apart points, and means for joining the arms at different points along their lengths to adjustably locate the said reference point in space.

4. A cut-off saw according to claim 1 in which the base includes a swivel table to which said members, element and linkage are mounted, whereby the sawblade can be swung in a horizontal plane relative to the worktable.

5. A cut-off saw according to claim 1 in which each member comprises a rod axially shiftable within a bearing, and means carried by said bearing to hold the rod against axial movement therein.

6. A cut-off saw according to claim 5 in which each lock includes a spring on both sides of the bearing for loading the member toward a central position.

7. A cut-off saw according to claim 1 in which clamp means are provided on the worktable, said clamp means comprising a pair of legs reciprocable toward the workpiece, a cam, an axle located off center in the cam and passing the legs through it, lock means for holding the legs to the axle, and a shoulder engageable by the cam and fixed to the worktable, whereby with the legs against the workpiece and locked to the axle, the cam may be pressed down to force the axle toward the workpiece, thereby locking the legs against the workpiece.

8. Clamp means for holding a workpiece to a table comprising: a pair of legs reciprocable toward the workpiece, a cam, an axle located off center in the cam and passing the legs through it, lock means for holding the legs to the axle, and a shoulder engageable by the cam and fixed to the worktable, whereby with the legs against the workpiece and locked to the axle, the cam may be pressed down to force the axle toward the workpiece, thereby locking the legs against the workpiece.

References Cited in the file of this patent

UNITED STATES PATENTS

| | | |
|---|---|---|
| 2,320,743 | Nilsen | June 1, 1943 |
| 2,343,556 | Jacobsen | Mar. 7, 1944 |
| 2,347,223 | Tautz | Apr. 25, 1944 |
| 2,726,652 | Brittain | Dec. 13, 1955 |
| 2,814,913 | De Witt | Dec. 3, 1957 |
| 2,855,733 | Allison | Oct. 14, 1958 |

FOREIGN PATENTS

| | | |
|---|---|---|
| 1,119,527 | France | Apr. 3, 1956 |